United States Patent [19]

Eshita et al.

[11] Patent Number: 5,433,933
[45] Date of Patent: Jul. 18, 1995

[54] METHOD OF PURIFYING OXYGEN-EXCESS EXHAUST GAS

[75] Inventors: Akinori Eshita; Senshi Kasahara, both of Shinnanyo; Shinichi Matsumoto, Aichi; Kazunobu Ishibashi, Toyota; Koji Yokota, Nagoya; Shiroh Kondoh, Aichi, all of Japan

[73] Assignees: Toyota Jidosha Kabushiki Kaisha, Toyota; Tosoh Corporation, Shinnanyo; Kabushiki Kaisha Toyota Chuo Kenkyusho, Aichi, all of Japan

[21] Appl. No.: 176,290

[22] Filed: Dec. 30, 1993

Related U.S. Application Data

[63] Continuation of Ser. No. 631,288, Dec. 20, 1990, abandoned.

[30] Foreign Application Priority Data

| Dec. 21, 1989 | [JP] | Japan | 1-331740 |
| Dec. 26, 1989 | [JP] | Japan | 1-337249 |
| Jun. 7, 1990 | [JP] | Japan | 1-149203 |
| Oct. 1, 1990 | [JP] | Japan | 2-264820 |

[51] Int. Cl.⁶ .................... B01D 53/94; B01D 53/86
[52] U.S. Cl. .................. 423/213.2; 423/239.2; 423/245.3; 423/247
[58] Field of Search .............. 423/213.2, 247, 239.1, 423/239.2, 245.3; 502/73, 74, 77

[56] References Cited

U.S. PATENT DOCUMENTS

| 3,181,928 | 5/1965 | Frilette | 423/213.2 |
| 3,407,030 | 10/1968 | Clifford | 423/213.2 |
| 3,839,545 | 10/1974 | Schwab | 423/213.2 |
| 4,052,337 | 10/1977 | Nishikawa et al. | 252/455 Z |
| 4,297,328 | 10/1981 | Ritscher et al. | 423/213.2 |
| 4,331,644 | 5/1982 | Ritscher | 423/437 |
| 4,855,115 | 8/1989 | Imanari | 423/239 |
| 4,867,954 | 9/1989 | Staniulis | 423/239 |
| 4,874,590 | 10/1989 | Staniulis et al. | 423/239 |
| 4,950,461 | 8/1990 | Schwetje | 423/239 |
| 5,041,272 | 8/1991 | Tamura et al. | 423/239 |
| 5,149,512 | 9/1992 | Li et al. | 423/239 |
| 5,260,043 | 11/1993 | Li et al. | 423/239.2 |
| 5,382,416 | 1/1995 | Nakano et al. | 423/213.2 |

FOREIGN PATENT DOCUMENTS

| 0018117 | 10/1980 | European Pat. Off. . | |
| 0373665 | 6/1990 | European Pat. Off. . | |
| 60-125250 | 7/1985 | Japan . | |
| 63-100919 | 5/1988 | Japan . | |
| 1-130735 | 5/1989 | Japan . | |
| 4-219147 | 8/1992 | Japan | 423/247 |
| 5-115751 | 5/1993 | Japan | 423/247 |

*Primary Examiner*—Gary P. Straub
*Assistant Examiner*—Timothy C. Vanoy
*Attorney, Agent, or Firm*—Oblon, Spivak, McClelland, Maier & Neustadt

[57] ABSTRACT

A method for purifying an exhaust gas containing an excess amount of oxygen, to remove nitrogen oxides, carbon monoxide and hydrocarbons therefrom, by bringing a catalyst into contact with the exhaust gas, the catalyst comprising a zeolite ion-exchanged with (a) cobalt or (b) both cobalt and at least one metal selected from the group consisting of alkaline earth metals and rare earth metals, the zeolite being selected from the group consisting of ferrierite, ZSM-5, ZSM-11, ZSM-12 and ZSM-20, and having a silica-to-alumina molar ratio of from 15 to 1,000.

6 Claims, No Drawings

METHOD OF PURIFYING OXYGEN-EXCESS EXHAUST GAS

This application is a Continuation of application Ser. No. 07/631,288, filed on Dec. 20, 1990, now abandoned.

BACKGROUND OF THE INVENTION

1. Field of the Invention

The present invention relates to a catalyst for and a method of purifying an exhaust gas containing an excess amount of oxygen, to remove nitrogen oxides ($NO_x$), carbon monoxide and hydrocarbons therefrom. The present invention is particularly applied to the purification of exhaust gases originated from internal combustion engines of automobiles and nitric acid production plants.

2. Description of the Related Art

To purify an exhaust gas emitted from the internal combustion engine of automobiles and other engines, to thereby reduce toxic substances such as nitrogen oxides ($NO_x$), carbon monoxide and hydrocarbons from the exhaust gas, a three-way catalyst which consists of platinum (Pt), rhodium (Rh), palladium (Pb) or other noble metals supported on a carrier material such as alumina ($Al_2O_3$) is used. Nevertheless, these catalysts on a carrier cannot be advantageously applied to the purification of exhaust gas from diesel engines, because the exhaust gas contains an excess amount of oxygen which can adversely affect the selective reduction of the nitrogen oxides. Note, the term "oxygen-excess exhaust gas" or "exhaust gas containing an excess amount of oxygen" is intended to mean that the exhaust gas contains an excess amount of oxygen beyond the amount necessary to completely oxidize carbon monoxide, hydrocarbons and hydrogen in the exhaust gas.

Similar problems can be found in gasoline engines. Namely, to reduce fuel consumption and lower an amount of carbon dioxides in the exhaust gas, gasoline engines are necessary to operate under lean burn conditions, i.e., at a lean air-fuel ratio (A/F) higher than a theoretical air-fuel ratio. Nevertheless, since the exhaust gas produced in the gasoline engines apparently contains an excess amount of oxygen, the above-described three-way catalyst on a carrier cannot be applied to the purification of the described exhaust gas on the same grounds, although it can reduce only the carbon monoxide and hydrocarbons through an oxidation thereof, and a method of completely reducing toxic substances from the exhaust gas of engines such as diesel engines and lean burn gasoline engines has not been put to practical use to date.

As an alternative to selectively reduce nitrogen oxides ($NO_x$) from the oxygen-excess exhaust gas, it is well-known to add a reducing agent such as ammonia to the exhaust gas, or to use an alkali to absorb the nitrogen oxides thereon. These well-known methods, however, do not ensure satisfactory results when applied to the purification of the exhaust gas from automobiles, because the automobiles are not a stationary object to which a purification unit can be easily mounted, and the exhaust gas is produced only while the automobiles are running. Namely, these methods have only limited fields of application.

In addition to the above-described purification methods, it is also well-known to use a catalyst having a transition metal introduced through an ion exchange on a zeolite substrate. For example, Japanese Unexamined Patent Publication (Kokai) No. 130735/1989 teaches a copper (Cu)-containing zeolite catalyst wherein Cu is introduced into the zeolite structure through an ion exchange. The described catalyst, when used to selectively reduce nitrogen oxides ($NO_x$) from an oxygen-excess atmosphere, which also contains unburned carbon monoxide and hydrocarbons, can effectively reduce the nitrogen oxides to nitrogen ($N_2$), a nontoxic substance. This reduction of the nitrogen oxides is considered possible because $NO_x$ is adsorbed on Cu, and then the adsorbed $NO_x$ is catalytically reacted with reducible, unburned hydrocarbons to thereby convert $NO_x$ to $N_2$. The Cu-containing catalyst can exhibit a satisfactory $NO_x$ reducing capability at a temperature of 200° C. or more, but suffers from the following drawbacks:

An initial catalytic activity of the Cu-containing zeolite catalyst is very high, because of good adsorption capability of Cu for $NO_x$, but a durability of the catalyst, especially at an elevated temperature is poor. Namely, the high catalytic activity of the catalyst is notably deteriorates when the catalyst is exposed to a high temperature condition for a long time. Therefore, there is a need to provide an improved catalyst with an excellent catalytic activity which is not deteriorated when used for a long time. Note, it is considered that the Cu-containing zeolite catalyst has such an insufficient durability only because Cu can migrate and aggregate in the zeolite at a temperature of about 600° C. or more, to thereby cause a loss of the catalytic activity of the catalyst, and a stability of the catalyst structure is lowered as a result of the presence of the contained Cu, and accordingly, the catalyst structure itself is destroyed after a long term use of the catalyst.

SUMMARY OF THE INVENTION

One object of the present invention is to solve the problems of the above-described prior art catalysts for purifying an exhaust gas, and more particularly, to provide an improved catalyst for purifying an exhaust gas containing an excess amount of oxygen such as that originated from an internal combustion engine of automobiles and nitric acid production plants, to simultaneously reduce nitrogen oxides ($NO_x$), carbon monoxide (CO) and hydrocarbons (HC) therefrom. This catalyst, in comparison with the prior art catalysts, has an excellent durability and therefore, maintains an excellent catalytic activity and purification capability thereof, without deterioration thereof, under high temperature conditions and for a long time. The catalyst has a stability over a wide range of temperature.

Another object of the present invention is to provide an improved method of purifying an exhaust gas containing an excess amount of oxygen. The exhaust gas to be purified is, as previously described, that emitted from the internal combustion engine such as diesel engine or gasoline engine, of automobiles or nitric acid production plants, for example.

These and other objects of the present invention will be understood from the below description of preferred embodiments of the present invention.

In one aspect of the present invention, there is provided a catalyst for purifying an exhaust gas containing an excess amount of oxygen to reduce nitrogen oxides, carbon monoxide and hydrocarbons therefrom, the zeolite used as a principal component of the catalyst being represented by the general formula:

$$xM_{2/n}O \cdot Al_2O_3 \cdot ySiO_2 \cdot zH_2O \quad (I)$$

in which
 M is a cation,
 n is a valency of the cation M,
 x is 0.8 to 2,
 y is at least 2, and
 z is at least zero. The catalyst comprises a zeolite having a molar ratio of $SiO_2$ to $Al_2O_3$ of at least 15, and containing cobalt alone or in combination with at least one metal selected from alkali earth metals and rare earth metals.

In another aspect of the present invention, there is provided a method of purifying an exhaust gas containing an excess amount of oxygen, which comprises bringing the described catalyst into contact with the exhaust gas to reduce nitrogen oxides, carbon monoxide and hydrocarbons therefrom.

DESCRIPTION OF THE PREFERRED EMBODIMENTS

In the catalyst of the present invention, the zeolite used as a principal component of the catalyst is represented by the general formula:

$$xM_{2/n}O \cdot Al_2O_3 \cdot ySiO_2 \cdot zH_2O \quad (I)$$

in which
 M is a cation,
 n is a valency of the cation M,
 x is 0.8 to 2,
 y is at least 2, and
 z is at least zero (0), preferably 2 to 7. Because of the specific three-dimensional net structure thereof, the zeolite has both an cation exchange capability and a molecular sieve function, and these properties are a basis for the use of the zeolite as a catalyst.

The zeolite used in the present invention includes both naturally occurring substances and synthesized substances, and when synthesized, the zeolite may be produced by using any conventional production process. Typical examples of the zeolite which can be advantageously used in the practice of the present invention include ferrierite, zeolite Y, ZSM-type zeolites such as ZSM-5, ZSM-11, ZSM-12 and ZSM-20, and other zeolites. Moreover, these zeolites may be used without treatment thereof or as produced or if desired, may be treated to obtain an ion exchanged zeolite. For example, the zeolite may be treated with an ammonium salt and mineral acid to obtain an $NH_4^+$-type and $H^+$-type ion exchanged zeolite, respectively.

The zeolite used in the present invention contains silicon dioxide ($SiO_2$) and alumina ($Al_2O_3$) in a molar ratio of $SiO_2$ to $Al_2O_3$ of at least 15, and carrying cobalt alone or in combination with at least one metal selected from alkali earth metals and rare earth metals.

In a first preferred embodiment of the present invention, the molar ratio of $SiO_2$ to $Al_2O_3$ in the zeolite is preferably 15 to 1,000, and the metal carried on the zeolite is cobalt (Co) in a molar amount which is 0.9 to 1.6 times higher than the molar amount of alumina. Note, the term "molar amount of Co" used herein means a mole number of Co compared with the mole number of alumina.

A molar ratio of $SiO_2/Al_2O_3$ in the zeolite is at least 15, but the upper value thereof is not limited, although as previously mentioned the range of from 15 to 1,000 is preferred. To obtain a catalyst having a satisfactory heat resistance and durability, the molar ratio of $SiO_2/Al_2O_3$ below 15 should be avoided. This is because the zeolite having $SiO_2/Al_2O_3$ ratio of less than 15 has a poor heat resistance and durability.

The zeolite catalyst according to this first preferred embodiment of the present invention contains cobalt (Co) introduced therein, and such a catalyst is referred to herein as a cobalt (Co)-containing zeolite catalyst. In a comparison of the molar amount of cobalt carried on the zeolite with that of alumina ($Al_2O_3$) in the zeolite, the former is 0.9 to 1.6 times higher than the latter. The molar amount of less than 0.9 times should be avoided, because it cannot ensure the production of a zeolite catalyst showing a diminished thermal deterioration and having a high durability. The molar amount of more than 1.6 times should be also avoided, because it cannot ensure the production of a zeolite catalyst having a high activity and durability. More particularly, it is considered that a molar amount of the cobalt of less than 0.9 times induces a reduced catalytic activity due to a limited amount of cobalt, which can act as an active point of the catalyst, and that of more than 1.6 times causes a clogging of fine pores opened on an outer surface of the zeolite, because a large amount of cobalt can adhere to the outer surface of the zeolite, and accordingly, the zeolite catalyst has a poor catalytic activity.

The introduction of cobalt (Co) into the zeolite can be carried out in accordance with any conventional methods; typically by an ion exchange method or impregnation method. In both of these methods, the cobalt is preferably used in the form of a water-soluble salt thereof, and example of useful water-soluble salts include cobalt nitrate, cobalt chloride, cobalt acetate and cobalt sulfate.

For example, the ion exchange method is preferably loaded out by repeating an ion exchange treatment of zeolite with cobalt (II) salt two or more times. This repeated ion exchange ensures a further improvement of the durability of the resulting catalyst, in addition to an improvement of the durability obtained by the introduction of cobalt in a molar amount of 0.9 to 1.6 times higher than that of alumina.

In this connection, it should be noted that, when the ion exchange treatment is not repeated, i.e., a single ion exchanging step is applied, it is very difficult to obtain the proper introduction of cobalt in a molar amount of 0.9 to 1.6 times. The single ion exchange step has problems such that a sufficient amount of the cobalt is not introduced into the zeolite, and that a bonding strength of the cobalt to ion exchange site(s) of the zeolite is not high, and therefore, the cobalt can be easily separated from the ion exchange site(s) upon an application of heat. To avoid these problems, it is considered best to apply other treatments such as evaporation to dryness in place of the single ion exchange step, but this does not give satisfactory results. Namely, due to a difficulty of ion exchanging the cobalt, the result of this evaporation of dryness is a physical support of a substantial portion of the cobalt on an outer surface of the zeolite, and this means that the durability of the resulting catalyst is better than that of the prior art catalysts, but the level of the durability is not significantly higher. Further, even if the molar amount of the cobalt of 0.9 times or more can be obtained with the above-described single ion exchange step, a bonding strength between the cobalt ion and zeolite in the catalyst will not become high enough to ensure that the catalyst has a satisfactory durability.

Contrary to the above, when two or more ion exchange steps are repeated to produce the cobalt (Co)-containig zeolite catalyst, a satisfactory amount of cobalt ion can be introduced through an ion exchange into ion exchange site(s) of the zeolite, in addition to the strong bond between the cobalt ion and the ion exchange site(s), and accordingly, a catalyst showing less thermal deterioration and a high durability can be obtained. An upper limit of the number of the ion exchange steps applied is not critical, but the most satisfactory results are obtained when the ion exchange steps are repeated in the range of from two times to five times. It was found that the resulting Co-containing zeolite catalyst shows no or little thermal deterioration under high temperature conditions, and that the durability thereof is significantly higher.

The impregnation method is preferably carried out, for example, by dipping the zeolite in an aqueous solution of the selected cobalt salt for about 1 to 2 hours, drying the dipped zeolite in an atmosphere, and if desired finally calcining it at an elevated temperature such as 500° C., whereby a satisfactory catalyst can be obtained. Nevertheless, in comparison with the above-described ion exchange method, the catalyst obtained in accordance with this impregnation method exhibits an excess adhesion of the cobalt ion onto only an outer surface of the zeolite, and therefore, only an insufficient and limited introduction of the cobalt ion into the ion exchange site(s).

Turning again to the ion exchange method, as previously mentioned, the cobalt is preferably used as water-soluble salts thereof, for example, nitrate, chloride, acetate and sulfate of cobalt (II). More preferably, cobalt (II) acetate is used in the introduction of the cobalt ion into the zeolite to thereby produce the desired catalyst showing no or less thermal deterioration and having a high level of durability. When the cobalt (II) nitrate, chloride or sulfate is used as the source material of cobalt, it is necessary to repeat the described ion exchange steps at least five times, to obtain the molar amount of cobalt of at least 0.9 times of that of alumina in the zeolite. This is because, with these cobalt (II) salts, the ion exchange of the cobalt in the zeolite progresses little in comparison with the case of cobalt (II) acetate.

The time for conducting the ion exchange is not limited to a certain range, and therefore, can be widely varied depending upon the specific ion exchange conditions desired results and other factors. Nevertheless, the ion exchange is preferably carried out for a time per step of 5 hours or more, more preferably 10 hours or more. An ion exchange time shorter than 5 hours should be avoided, because it is accompanied by a notable reduction of the ion exchange efficiency. Note, in such a case, and when cobalt (II) acetate is used as a source material, it is essential to repeat the ion exchanging step at least five times, to obtain satisfactory results.

In practice, the ion exchange treatment can be carried out, for example, by adding a salt of cobalt (II) to a slurry of zeolite and stirring the mixture, or by adding the zeolite to an aqueous solution containing a salt of cobalt (II) and stirring the mixture. Of course, other ion exchange treatments may be carried out, if appropriate. In these ion exchange treatments, a temperature of the solution or system is preferably in the range of 50° to 100° C., more preferably 60° to 90° C. When the temperature is lower than the above-described lower limit, it becomes necessary to repeat the treatment because the ion exchange efficiency is often lowered, and when the temperature is higher than the upper limit, it will become impossible to conduct the ion exchange because the concentration of the slurry is excessively increased as a result of an evaporation of water used as a solvent.

The cobalt salt is preferably used as an aqueous solution thereof, and a concentration of the cobalt salt in the aqueous solution is preferably in the range of 0.01 to 1 mole/l, more preferably 0.1 to 1 mole/l. A concentration below 0.01 mole/l will reduce the operability of the ion exchange process, because a remarkably larger amount of the solution must be used to control an amount of the cobalt to a desired level. Further, a concentration above 1 mole/l will not result in a significant improvement of the ion exchange efficiency despite of the supply of more than the necessary amount of the cobalt salt. Moreover, the excessively increased concentration of the cobalt salt will cause a problem in that a larger amount of cobalt is selectively loaded on an outer surface of the zeolite, and thus the micropores of the zeolite are clogged because a solubility of the cobalt salt in water is relatively low.

Generally, the ion exchange is completed after repeating the above-described ion exchanging steps two or more times. Nevertheless, if a molar ratio of $CoO/Al_2O_3$ in the ion-exchanged zeolite is smaller than the lower limit thereof, i.e., 0.9, it is preferable to further mix the ion-exchanged zeolite with an aqueous solution containing enough the cobalt to adjust the molar ratio of $CoO/Al_2O_3$ to the range of from 0.9 to 1.6, and to evaporate the water in the mixture to dryness. The evaporation the water to dryness of the mixture can be carried out by any conventional method, for example, the zeolite is added to an aqueous solution containing the cobalt salt, and the solution is dried in a drying oven or similar apparatus to evaporate the water used as a solvent. In this process, a preferred concentration of the cobalt salt in the aqueous solution is 0.01 mole/l or more, as a concentration of less than 0.01 mol/l requires an extended water evaporation time. An upper limit of the concentration of the cobalt salt is not critical, but generally the concentration should not exceed 0.5 mol/l, because a higher concentration of the cobalt salt prevents a uniform adhesion of the cobalt to the zeolite.

After the ion exchange, the treated zeolite is subjected to a solid-liquid separation, followed by washing and drying. The dried product can be used as a catalyst for the purification of an exhaust gas, and if desired, may be calcined at a suitable elevated temperature. Note, in the thus obtained catalyst, a molar ratio of $SiO_2/Al_2O_3$ thereof is substantially the same as that of the zeolite used as the starting substrate, and a crystalline structure of the catalyst is substantially the same as that of the zeolite. Namely, before and after the ion exchange, the crystalline structure of the zeolite is not substantially changed.

The cobalt (Co)-containing zeolite catalyst of the present invention can be further treated, if desired. For example, the catalyst may be molded into any desired shape, such as a powdered body, pellet structure and honeycomb structure. Further, the powder-like catalyst may be admixed with a binding agent such as clay, minerals, alumina sol and silica sol, followed by molding the admixture into any desired shape or structure.

Suitable example of the clay and minerals used as the binding agent include kaolin, attapulgite, montmorillonite, bentonite, allophane and sepiolite. Alternatively, in the absence of a binding agent, the catalyst may be directly molded into a binder-less molded product of zeolite. Furthermore, after the previous molding of the zeolite, the cobalt ion may be introduced into the molded product of zeolite by using an ion exchange or other method. In addition to these methods, including the molding step, the catalyst may be mixed with water to prepare an aqueous slurry thereof, followed by washcoating the slurry onto a honeycomb-structured refractory substrate such as ceramics, for example, cordierite or alumina, and metals.

The Co-containing zeolite catalyst of the present invention can be widely used in the purification of various types of exhaust gas, with satisfactory results. The catalyst is particularly suited to the reduction of nitrogen oxides ($NO_x$), carbon monoxide (CO) and hydrocarbons (HC) from an oxygen-excess exhaust gas. The term oxygen-excess exhaust gas, as already explained, means an exhaust gas which contains an amount of oxygen in excess of the amount necessary to completely oxidize the CO, HC and hydrogen (H) in the exhaust gas, and includes those, for example, exhausted from the internal combustion engine of automobiles. A typical example of such an exhaust gas from the engine is an exhaust gas produced in the engine at a high air/fuel (A/F) ratio, i.e., lean condition. Of course, the catalyst of the present invention can be similarly applied to the purification of the non-oxygen-excess exhaust gas containing CO, HC and $H_2$, without a change of the excellent performance thereof and with satisfactory results.

In a second preferred embodiment of the present invention, the molar ratio of $SiO_2$ to $Al_2O_3$ in the zeolite is at least 15, preferably 15 to 1,000, and the metal containing in the zeolite is cobalt (Co) and alkali earth metal. The alkali earth metal used in combination with the cobalt may be one metal or a combination of two or more metals.

The molar ratio of $SiO_2$ to $Al_2O_3$ has an lower limit of 15, but has no upper limit, and is preferably in the range of 15 to 1,000. Note, the $SiO_2/Al_2O_3$ ratio of less than 15 should be avoided, because it is cannot provide a catalyst having a satisfactory heat resistance and durability.

The catalyst according to this second embodiment of the present invention contains cobalt (Co) and an alkali earth metal induced therein, and such catalyst is referred to herein as a cobalt (Co)- and alkali earth metal-containing zeolite catalyst. In this zeolite catalyst, the cobalt and the alkali earth metal are preferably introduced into the zeolite in a molar amount which is 0.5 to 1.7 times and 0.1 to 1 times higher, respectively, than the molar amount of the alumina in the zeolite, and the total molar amount of the cobalt and alkali earth metal is 1.0 to 2.5 times higher than the molar amount of the alumina. With regard to the amount of the cobalt, the $Co/Al_2O_3$ ratio of less than 0.5 will cause a problem in that the final product cannot be suitably used as a catalyst due to a low catalytic activity and the like, and a $Co/Al_2O_3$ ratio of more than 1.7 will cause a problem in that the resulting catalyst does not exhibit a satisfactory durability and catalytic activity which will counterbalance the amount of the cobalt introduced to the zeolite. With regard to the amount of the alkali earth metal, the alkali earth metal/$Al_2O_3$ ratio of less than 0.1 often will provide the catalyst having only a slightly improved catalytic activity and durability, and with an alkali earth metal/$Al_2O_3$ ratio of more than 1, often the resulting catalyst does not exhibit effects which will counterbalance the amount of alkali earth metal.

The alkali earth metal introduced together with the cobalt (Co) into the zeolite can be freely selected, and is preferably selected from the group consisting of magnesium (Mg), calcium (Ca), strontium (Sr) and barium (Ba). As previously mentioned, these alkali earth metals may be used alone or in combination.

The introduction of cobalt (Co) and alkali earth metal into the zeolite can be carried out in accordance with any conventional method, typically an ion exchange method or impregnation method, but preferably, an ion exchange method. In both of these methods, the cobalt is preferably used in the form of a water-soluble salt thereof, and example of useful water-soluble salts include cobalt nitrate, cobalt chloride, cobalt acetate and cobalt sulfate. Among these water-soluble salts, cobalt acetate is preferably used. Similarly, the alkali earth metal is preferably used in the form of a water-soluble salt thereof such as nitrate, chloride, acetate and sulfate. Nitrate and chloride are most preferred, because they have a high solubility in water.

The ion exchange of the cobalt and alkali earth metal can be carried out in a manner similar to those described above with regard to the introduction of the cobalt into the zeolite. The sequence of the ion exchange for the cobalt and alkali earth metal is not restricted, but preferably the alkali earth metal is first introduced into the zeolite, followed by and the cobalt.

Basically, the ion exchange of the alkali earth metal can be carried out in the same manner as for the above-described ion exchange of the cobalt. For example, the ion exchange can be carried out by adding a salt of alkali earth metal to a slurry of zeolite and stirring the mixture, or by adding the zeolite to an aqueous solution containing a salt of alkali earth metal and stirring the mixture. In this and other ion exchange steps, a temperature of the solution or system is generally in the range of 20° to 100° C., preferably 40° to 90° C. The salt of alkali earth metal is preferably used as an aqueous solution thereof, and a concentration of the alkali earth metal in the aqueous solution is preferably in the range of 0.01 to 5 mole/l, more preferably 0.1 to 2 mole/l. A solid/liquid ratio of zeolite and aqueous solution is not restricted, and therefore, can be widely varied; with the proviso that stirring can be satisfactorily carried out without problem. Nevertheless, a concentration of the solid in the slurry is preferably in the range of 5 to 50%.

The ion exchange of the cobalt has been described, and therefore, the details thereof will not be repeated herein, to avoid duplication. In brief, the number of ion exchange steps is not restricted as long as a satisfactory high ion exchange efficiency is obtained. Nevertheless, two to five ion exchange steps are most preferable. Further, the cobalt is preferably introduced into the zeolite from an aqueous salt of the cobalt salt such as cobalt acetate, wherein a concentration of the cobalt salt in the aqueous solution is preferably in the range of 0.01 to 1 mole/l, more preferably 0.1 to 1 mole/l. The reasons why the described range of the concentration of the cobalt salt is preferred have been given heretofore.

In addition to the ion exchange, the alkali earth metal and cobalt each can be advantageously introduced into the zeolite by another technique, such as impregnation and an evaporation to dryness. The impregnation method can be carried out, for example, by dipping the zeolite in an aqueous solution of the selected cobalt salt and alkali earth metal salt for about 1 to 2 hours, drying the dipped zeolite in an atmosphere, and if desired, finally, calcining it at an elevated temperature such as 500° C. The method based on the evaporation to dryness can be carried out by a conventional manner. For example, it can be carried out by mixing the zeolite with an aqueous solution containing the alkali earth metal and/or cobalt, and heating the mixture in a drier to evaporate the water used as the solvent. A concentration of the alkali earth metal or cobalt in the aqueous solution can be widely varied, but to obtain a uniform adhesion thereof to the zeolite, it is generally preferred that the concentration of each of the alkali earth metal and cobalt is in the range of 0.01 to 1 mole/l.

After the ion exchange, the treated zeolite is followed by a solid-liquid separation, washing and drying. The dried product can be used as a catalyst for the purification of an exhaust gas, and if desired, can be calcined. Moreover, the cobalt (Co)-, alkali earth metal-containing zeolite catalyst can be further treated, if desired, to obtain a molded product thereof or other articles. Also, the Co-, alkali earth metal-containing zeolite catalyst can be widely used in the purification of various types of exhaust gases, with satisfactory results. Note, a detailed description of these points is omitted, since has it has been given hereinbefore with reference to the Co-containing zeolite catalyst.

In a third preferred embodiment of the present invention, the molar ratio of $SiO_2$ to $Al_2O_3$ in the zeolite is at least 15, preferably 15 to 1,000, and the metal containing in on the zeolite is cobalt (Co) and rare earth metal. The rare earth metal used in combination with the cobalt may be a single metal or a combination of two or more metals.

The molar ratio of $SiO_2$ to $Al_2O_3$ has a lower limit of 15 but has no upper limit, and is preferably in the range of 15 to 1,000. Note, the $SiO_2/Al_2O_3$ ratio of less than 15 should be avoided, because a zeolite catalyst having a satisfactory heat resistance and durability cannot be obtained.

The catalyst according to this third embodiment of the present invention contains cobalt (Co) and rare earth metal induced therein, and such a catalyst is referred herein to as a cobalt (Co)-, rare earth metal-containing zeolite catalyst. In this catalyst, the cobalt and rare earth metal are preferably introduced into the zeolite in a molar amount which is 0.5 to 1.7 times and 0.1 to 0.8 times higher, respectively, than the molar amount of the alumina in the zeolite, and the total molar amount of the cobalt and rare earth metal is 1.0 to 2.2 times higher than the molar amount of the alumina. With regard to the amount of the cobalt, the $Co/Al_2O_3$ ratio of less than 0.5 will cause a problem in that the final product cannot be suitably used as a catalyst due to a lower catalytic activity and the like, and the $Co/Al_2O_3$ ratio of more than 1.7 will cause a problem in that the resulting catalyst does not exhibit a satisfactory durability and catalytic activity which will counterbalance the amount of the cobalt introduced to the zeolite. With regard to the amount of the rare earth metal, the rare earth metal/$Al_2O_3$ ratio of less than 0.1 often provides a catalyst having only a slightly improved catalytic activity and durability, and with the rare earth metal/$Al_2O_3$ ratio of more than 0.8 often the resulting catalyst does not exhibit effects which will counterbalance the amount of the rare earth metal.

The rare earth metal introduced together with the cobalt (Co) into the zeolite can be freely selected, but is preferably selected from the group consisting of lanthanum (La), cerium (Ce), yttrium (Y), praseodymium (Pr), samarium (Sm) and neodymium (Nd). As previously mentioned, these rare earth metals may be used alone or in combination.

The introduction of cobalt (Co) and rare earth metal into the zeolite can be carried out in accordance with any conventional method, typically an ion exchange method or impregnation method, most preferably, an ion exchange method. In both of these methods, the cobalt is preferably used in the form of a water-soluble salt thereof, and example of useful water-soluble salts include cobalt nitrate, cobalt chloride, cobalt acetate and cobalt sulfate. Among these water-soluble salts, cobalt acetate is preferably used. Similarly, the rare earth metal is preferably used in the form of a water-soluble salt thereof such as nitrate, chloride, acetate and sulfate. Especially, nitrate and chloride are preferred, because they have a high solubility in water.

The ion exchange of the cobalt and rare earth metal can be carried out in the same manner as described above with regard to the introduction of the cobalt into the zeolite. The sequence of the ion exchange for the cobalt and rare earth metal is not restricted, but preferably the rare earth metal is first introduced into the zeolite, followed by the cobalt.

Basically, the ion exchange of the rare earth metal can be carried out in the same manner as for the above-described ion exchange of the cobalt. For example, the ion exchange can be carried out by adding a salt of rare earth metal to a slurry of zeolite and stirring the mixture, or by adding the zeolite into an aqueous solution containing a salt of rare earth metal and stirring the mixture. In this and other ion exchange steps, a temperature of the solution or system is generally in the range of 20° to 100° C., preferably 40° to 90° C. The salt of rare earth metal is preferably used as an aqueous solution, and a concentration of the rare earth metal in the aqueous solution is preferably in the range of 0.01 to 5 mole/l, more preferably 0.1 to 2 mole/l. A solid/liquid ratio of zeolite and aqueous solution is not restricted, and therefore, can be widely varied as long as stirring can be satisfactorily carried out without problem. Nevertheless, a concentration of the solid in the slurry is preferably in the range of 5 to 50%.

The ion exchange of the cobalt has been already described, and therefore, details thereof are not given here, to avoid duplication. In brief, the number of this ion exchange stops is not restricted, as long as a satisfactorily high ion exchange efficiency is obtained. Nevertheless, two to five ion exchanging steps are most preferable. Further, the cobalt is preferably introduced into the zeolite from an aqueous salt of the cobalt salt such as cobalt acetate, wherein a concentration of the cobalt salt in the aqueous solution is preferably in the range of 0.01 to 1 mole/l, more preferably 0.1 to 1 mole/l. The reason why the described range of the concentration of the cobalt salt is preferred has been given.

In addition to the ion exchange, the rare earth metal and cobalt each can be advantageously introduced into the zeolite by using other technique such as impregnation and evaporation to dryness. The impregnation method and the method based on the evaporation to dryness can be carried out in the same manner as described for the production of the Co-containing zeolite catalyst and the Co-, alkali earth metal-containing zeolite catalyst.

After the ion exchange, the treated zeolite is subjected to a solid-liquid separation, followed by washing and drying. The dried product can be used as a catalyst for the purification of an exhaust gas, and if desired, can be calcined. Moreover, the cobalt (Co)-, rare earth metal-containing zeolite catalyst can be further treated, if desired, to obtain a molded product thereof or other articles. Further, the Co-, rare earth metal-containing zeolite catalyst can be widely used in the purification of various types of exhaust gases, with satisfactory results. Note, a detailed description of these points is omitted, since it has been mentioned hereinbefore with reference to the Co-containing zeolite catalyst.

In a fourth preferred embodiment of the present invention, the molar ratio of $SiO_2$ to $Al_2O_3$ in the zeolite is at least 15, preferably 15 to 1,000, and the metal containing in the zeolite is cobalt (Co), at least one alkali earth metal and at least one rare earth metal. The alkali earth metal and the rare earth metal used in combination with the cobalt may be a single metal or a combination of two or more metals.

The catalyst according to this fourth embodiment of the present invention contains cobalt (Co), alkali earth metal and rare earth metal in combination induced therein, and such a catalyst is referred herein to as a cobalt (Co)-, alkali earth metal- and rare earth metal-containing catalyst.

The catalyst described herein effectively purifies an oxygen-excess exhaust gas to simultaneously reduce nitrogen oxides ($NO_x$), carbon monoxide (CO) and hydrocarbons (HC) therefrom. Especially, the zeolite catalyst is effective for selectively reducing nitrogen oxides ($NO_x$) from the exhaust gas in an oxygen-excess atmosphere. Since it has a notably improved $NO_x$ reduction capability, compared with the prior art Cu-containing zeolite catalyst, the catalyst of the present invention can be advantageously utilized in the purification of the oxygen-excess exhaust gas from the nitric acid production plants, in addition to the purification of the exhaust gas from the internal combustion engine of automobiles.

The surprisingly improved performances of the described catalyst are obtained as a function of the synergistic actions of the cobalt, alkali earth metal and rare earth metal. The cobalt has a capability of selectively adsorbing $NO_x$ thereon. The alkali earth metal and rare earth metal each has an action of accelerating a selective reaction of $NO_x$ and hydrocarbons (HC) on the cobalt, because each metal or a complex thereof with the zeolite can directly or indirectly adsorb the hydrocarbons thereon. Namely, according to the present invention, each of the excellent actions of the cobalt, alkali earth metal and rare earth metal can be effectively combined to give a superior performance catalyst. In addition, a durability of the catalyst is improved, because the alkali earth metal and rare earth metal can inhibit a formation of coke during the reaction of $NO_x$ and HC.

The reaction during which the described catalyst of the present invention can exhibit the excellent effects exhaust gas, $NO_x$ is adsorbed on the cobalt, and $NO_x$, HC thereof has not been clarified. Nevertheless, it is considered that upon contact of the catalyst with the and other organic components are adsorbed on the alkali earth metal and rare earth metal, and as a result, $NO_x$ and others are immediately brought into contact and reacted with organic compounds in the exhaust gas, to thereby reduce them to nontoxic nitrogen ($N_2$). It is assumed that the reaction in this reduction of $NO_x$ to $N_2$ is represented by the following reaction schema:

$$uHC + vNO_2 \rightarrow wH_2O + yCO_2 + zN_2$$

Further, even if exposed to an elevated temperature of 600° to 800° C., little reduction of the cobalt to metallic cobalt occurs and there is little migration to and aggregation thereof on the zeolite. Furthermore, if introduced into the zeolite at a level above the certain amount ($CoO/Al_2O_3 = 0.9$), the cobalt has an improved bonding strength thereof to the zeolite, and accordingly, has an improved durability. In addition, since $NO_x$ activity and inhibit a formation of coke, it becomes the alkali earth metal and rare earth metal are further incorporated into the zeolite, and these metals have a possible to improve the catalytic activity and durability of the resulting catalyst. The reason why the aggregation of the cobalt is prevented is also considered to be because the cobalt ion can easily react with the alkali earth metal and rare earth metal, to thereby form a perovskite-type complex oxide.

As previously described, the zeolite used as a principal component of the catalyst of the present invention is represented by the general formula (I), and is conventionally used as the catalyst because of its excellent cation exchange capability and molecular sieve function. More particularly, the zeolite has a tetrahedral network structure of $SiO_4$ and $AlO_4$, in which each tetrahedral structure is bonded to the other through a crosslinking of oxygen on an edge portion thereof. The network structure of the zeolite therefore contains through-passages and through-cavities therein, and an ion exchangable cation such as $H^+$, $Na^+$ or the like is introduced into ion exchange site(s) of the lattice having a negative charge.

In the catalyst according to the fourth preferred embodiment of the present invention, the molar ratio of $SiO_2$ to $Al_2O_3$ in the zeolite has lower limit of 15, but has no upper limit, and is preferably in the range of 15 to 1,000. Note, the preferred range of $SiO_2/Al_2O_3$ ratio is the same as that of the previously described Co-, alkali earth metal-containing zeolite catalyst and Co-, rare earth metal-containing zeolite catalyst, and in the present catalyst, the $SiO_2/Al_2O_3$ ratio of less than 15 causes a deterioration of the thermal stability of the catalyst at a higher temperature of 600° C. or more, and the $SiO_2/Al_2O_3$ ratio of more than 1,000 causes a reduction of the ion exchange level, i.e., catalytic activity, since the ion exchange site(s) are diminished as a result of a reduction of the $Al_2O_3$ amount. Since the thermal deterioration is principally induced due to a change of the structure of the aluminum (Al) and surrounding areas, it is preferable to control the $SiO_2/Al_2O_3$ ratio in the zeolite to 20 or more (relatively small amount of $Al_2O_3$), to thereby ensure a satisfactory durability under high temperature conditions. Typical examples of useful zeolites satisfying the above range of $SiO_2/Al_2O_3$ ratio include ZSM-5 having the $SiO/Al_2O_3$ ratio of 20 to 200, zeolite Y and those having a mordenite structure. Further, as the zeolite, the previously mentioned $NH_4^+$ and $H^+$ ion exchanged zeolites in which the ion exchange site(s) contain $NH_4^+$ and $H^+$ ions bonded thereto, respectively, can be advantageously used because $NH_4^+$ and $H^+$ ions are easily ion-exchanged with the cobalt, alkali earth metal and rare earth metal ions. Similarly, Na-type zeolite can be advantageously used. In these zeolites, preferably the zeolite surface contains micropores having a small pore size of 10Å or less. Such a small pore size is enough to prevent an undesirable introduction of polycyclic aromatic hydrocarbons into the pores of the zeolite, to thereby inhibit a formation of coke and prevent a destruction of the structure and reduction of the catalytic activity thereof due to a clogging of the pores.

The alkali earth metal and rare earth metal introduced together with the cobalt (Co) into the zeolite can be freely selected, and the alkali earth metal is preferably selected from the group consisting of magnesium (Mg), calcium (Ca), strontium (Sr) and barium (Ba). More preferably, Mg, Ca, Sr and Ba are used as the alkali earth metal. The rare earth metal is preferably selected from the group consisting of lanthanum (La), cerium (Ce), yttrium (Y), praseodymium (Pr), samarium (Sm) and neodymium (Nd).

In the cobalt (Co)-, alkali earth metal-, rare earth metal-containing zeolite catalyst of the present invention, the cobalt, alkali earth metal and rare earth metal are preferably introduced into the zeolite in an amount of 2.0 to 5.0% by weight, 0.05 to 10% by weight and 0.05 to 10% by weight, respectively, with regard to the weight of the zeolite.

In connection with the above-described preferred range of the content of the cobalt, alkali earth metal and rare earth metal, it should be noted that a cobalt content of less than 2.0% by weight should be avoided, because it does not ensure a satisfactory catalytic effect. Of course, the catalytic effect can be improved when the cobalt content is increased, but a cobalt content of above 5.0% by weight should be avoided because it causes an easy migration and aggregation of the cobalt, and thus a deterioration of the catalyst, in addition to an increase of the difficulty of introducing the alkali earth and rare earth metals.

The alkali earth and rare earth metals are preferably used in the amount of 0.05 to 10% by weight, respectively. Namely, the effects induced with the addition of these metals can be found from the amount of 0.05% by weight. To obtain satisfactory effects, it is preferable to add these metals in an amount of 0.3% by weight or more, but an amount above 10% by weight should be avoided because it will reduce an acid point necessary to conduct the reaction between the $NO_x$ and HC, and thus retard the reaction itself. Note, generally, an optimum purification temperature for $NO_x$ is shifted to a high temperature side when the amount of the alkali earth and rare earth metals introduced is increased, and therefore, the amount of metals introduced should be increased in accordance with the conditions under which the catalysts are used.

The introduction of the cobalt (Co), alkali earth metal and rare earth metal into the zeolite can be carried out in accordance with any conventional methods, such as ion exchange and/or impregnation. Note, since these conventional methods are described above with reference to the production of the cobalt (Co)-containing, Co- and alkali earth metal-containing, and Co- and rare earth metal-containing zeolite catalysts, a detailed description of the introduction process will be omitted herein.

In both of the ion exchange and impregnation methods, the cobalt and alkali earth and rare earth metals are preferably used in the form of a water-soluble salt thereof, more preferably, as an acetate or nitrate. In the impregnation process, the cobalt and alkali earth and rare earth metals may be simultaneously impregnated into the zeolite.

In an example of the ion exchange method, the zeolite is dipped in an aqueous solution of the cobalt, alkali earth metal and rare earth metal, preferably acetate and or nitrate thereof, for 24 to 48 hours (ion exchanging step), and then the dipped zeolite is dried at 100° to 120° C. for about 10 hours. In the ion exchange step, a temperature of the solution or system is 20° to 100° C., preferably 40° to 90° C. If desired, the ion exchange step may be repeated, and the number of the repetitions of the ion exchange steps is determined by various factors, such as the desired efficiency of the ion exchange. As will be understood, this ion exchange method is based on the phenomenon that ions of the cobalt and alkali earth and rare earth metals are ion-exchanged with cations of the zeolite, and thus the former ions are strongly bonded to the zeolite.

The impregnation method can be carried out, for example, by dipping the zeolite in an aqueous solution such as used in the above ion exchange method, for about 1 to 2 hours, drying the dipped zeolite in the atmosphere, and finally, calcining it an elevated temperature such as 500° C.

After the ion exchange, impregnation or other treatments, the treated zeolite is subtracted to solid-liquid separation, followed by washing and drying. The dried product can be used as a catalyst for the purification of an exhaust gas, and if desired, can be calcined. Moreover, the cobalt (Co)-, alkali earth metal- and rare earth metal-containing zeolite catalyst can be further treated, if desired, to obtain a molded product thereof, or other articles. As previously mentioned, the catalyst of the present invention may have different shapes and structures, such as a powdered body, pellets and honeycomb body, as well as a composite body comprising a refractory substrate such as a honeycomb-structure alumina body and a coating of the catalyst applied from an aqueous slurry of the catalyst. Further, the Co-, alkali earth metal- and rare earth metal-containing zeolite catalyst can be widely used in the purification of various types of exhaust gases, with satisfactory results. Note, a detailed description of these points is omitted, since it has been mentioned hereinbefore with reference to other types of catalysts according to the present invention.

The last-mentioned catalyst of the present invention is particularly intended to purify the $NO_x$ in the exhaust gas through a reaction between the $NO_x$ and the unburned hydrocarbons or partially burned products thereof containing oxygen. The hydrocarbons and other substances involved in the purification process may be those originally contained in the exhaust gas. Nevertheless, if an amount of such substances in the exhaust gas is considered to be relatively low, additional hydrocarbons from the outside may be added to the exhaust gas.

The present invention will be further described with reference to working examples thereof and comparative examples. Note, the scope of present invention is not restricted to these appended examples.

EXAMPLE 1

Preparation of Catalyst No. 1

An amount of 20 g of $NH_4^+$ ion exchanged ZSM-5 having a molar ratio of $SiO_2/Al_2O_3$ of 40 was mixed with 180 g of an aqueous solution of cobalt (II) acetate.-tetrahydrate (concentration: 0.23 mole/l), and the mixture was stirred at 80° C. for 16 hours. After the slurry was subjected to a solid-liquid separation, the separated zeolite cake was mixed with a newly-prepared aqueous solution of cobalt (II) acetate.tetrahydrate having the same composition as that used in the above step, followed by the same procedure. After the solid-liquid separation, the separated zeolite cake was thoroughly washed with water, and then dried at 110° C. for 10 hours. A chemical analysis of the thus obtained catalyst (hereinafter referred to as Catalyst No. 1) indicated that Catalyst No. 1 contains the cobalt (II) in a molar ratio of $CoO/Al_2O_3$ in the zeolite of 1.09.

EXAMPLE 2

Preparation of Catalyst No. 2

The procedure of Example 1 was repeated except that the concentration of the aqueous solution of cobalt (II) acetate.tetrahydrate was increased to 0.5 mole/l, and the ion exchange steps were repeated three times (5 hours×2, 16 hours×1). A chemical analysis of the thus obtained catalyst (hereinafter referred to as Catalyst No. 2) indicated that Catalyst No. 2 contains cobalt (II) in a molar ratio of $CoO/Al_2O_3$ in the zeolite of 1.46.

EXAMPLE 3

Preparation of Catalyst No. 3

The procedure of Example 1 was repeated except that the concentration of the aqueous solution of cobalt (II) acetate.tetrahydrate was increased to 0.5 mole/l, and the ion exchange steps were repeated two times (10 hours '2). The thus obtained zeolite catalyst contained cobalt (II) in a molar ratio of $CoO/Al_2O_3$ in the zeolite of 0.94.

An amount of 20 g of the above zeolite catalyst was added to 34 ml of an aqueous solution of cobalt (II) nitrate.hexahydrate containing the cobalt in an amount corresponding to 1% by weight of metallic cobalt. The mixture was first dried at 85° C. for 10 hours, and then dried at 110° C. for 10 hours to be evaporated to dryness. A chemical analysis of the residue (hereinafter referred to as Catalyst No. 3) indicated that Catalyst No. 3 contains cobalt (II) in a molar ratio of $CoO/Al_2O_3$ in the zeolite of 1.37.

EXAMPLE 4

Preparation of Catalyst No. 4

An amount of 20 g of $NH_4^+$ ion exchanged ZSM-5 having a molar ratio of $SiO_2/Al_2O_3$ of 40 was mixed with an aqueous solution of cobalt (II) nitrate.tetrahydrate (concentration: 0.1 mole/l). The aqueous solution used herein was previously weighed to adjust the cobalt content with regard to mole numbers of the alumina in the zeolite as the starting material to 1.2 times. The mixture was stirred at a room temperature for 16 hours, and then dried at 85° C. for 12 hours, followed by drying at 110° C. for 12 hours. A chemical analysis of the thus obtained catalyst (hereinafter referred to as Catalyst No. 4) indicated that Catalyst No. 4 contains cobalt (II) in a molar ratio of $CoO/Al_2O_3$ in the zeolite of 1.19.

Comparative Example 1

Preparation of Comparative Catalyst No. 1

The procedure of Example 1 was repeated except that the concentration of the aqueous solution of cobalt (II) acetate.tetrahydrate was increased to 1.14 mole/l, and the ion exchange steps were repeated two times (4 hours ×2). A chemical analysis of the thus obtained catalyst (hereinafter referred to as Comparative Catalyst No. 1) indicated that Comparative Catalyst No. 1 contains cobalt (II) in a molar ratio of $CoO/Al_2O_3$ in the zeolite of 0.79.

Comparative Example 2

Preparation of Comparative Catalyst No. 2

The procedure of Example 1 was repeated except that the concentration of the aqueous solution of cobalt (II) acetate-tetrahydrate was reduced to 0.23 mole/l, and the ion exchange steps were repeated eight times (16 hours × 8). A chemical analysis of the thus obtained catalyst (hereinafter referred to as Comparative Catalyst No. 2) indicated that Comparative Catalyst No. 2 contains cobalt (II) in a molar ratio of $CoO/Al_2O_3$ in the zeolite of 2.54.

Comparative Example 3

Preparation of Comparative Catalyst No. 3

The procedure of Example 1 was repeated except that the concentration of the aqueous solution of cobalt (II) aetate-tetrahydrate was reduced to 0.23 mole/l, and the ion exchange step was not repeated (20 hours× 1). A chemical analysis of the thus obtained catalyst (hereinafter referred to as Comparative Catalyst No. 3) indicated that Comparative Catalyst No. 1 contains cobalt (II) in a molar ratio of $CoO/Al_2O_3$ in the zeolite of 0.84.

Comparative Example 4

Preparation of Comparative Catalyst No. 4

An amount of 20 g of $NH_4^+$ ion exchanged ZSM-5 having a molar ratio of $SiO_2/Al_2O_3$ of 40 was mixed with an aqueous solution of copper (II) acetate.hydrate (concentration: 0.1 mole/l), and, immediately after the mixing of the zeolite, a 2.5% amount of ammonia water was added to the aqueous solution to adjust a pH value thereof to 10.5. The aqueous solution used herein was previously weighed to adjust the copper content with regard to mole numbers of the alumina in the zeolite as the starting material to 2 times. The mixture was stirred at a room temperature for 16 hours. After the solid-liquid separation, the solid residue was thoroughly washed with water, and then dried at 110° C. for 10 hours. A chemical analysis of the thus obtained catalyst (hereinafter referred to as Comparative Catalyst No. 4) indicated that Comparative Catalyst No. 4 contains copper (II) in a molar ratio of $CuO/Al_2O_3$ in the zeolite of 1.04.

Catalytic Activity Evaluation of Catalysts Nos. 1 to 4 and Comparative Catalysts Nos. 1 to 4

Evaluation of Catalytic Activity

To evaluate a catalytic activity of each of Catalysts Nos. 1 to 4 prepared in Example 1 to 4, the zeolite catalyst was press-molded and then crushed to obtain a granular catalyst having a granule size of 12 to 20 meshes. An amount of 0.65 g of the granular catalyst was filled into an atmospheric pressure fixed bed flow type reaction tube. To conduct a pretreatment, a gas having the following composition (hereinafter referred to as a reaction gas) was introduced at a flow rate of 600 ml/min. into the reaction tube, and the temperature in the reaction tube was elevated to 500° C. and held at that temperature for 30 minutes.

| Composition of Reaction Gas | |
|---|---|
| NO | 700 ppm |
| $O_2$ | 4% |
| CO | 1000 ppm |
| $C_3H_6$ | 400 ppm |
| $H_2O$ | 3% |
| $N_2$ | balance |

After the pretreatment, the temperature of the reaction tube was reduced to 200° C. and then again elevated to 800° C. at an elevation rate of 5° C./min. (hereinafter, Reaction 1).

The temperature of 800° C. was held for 5 hours, and then the reaction gas was replaced with a nitrogen ($N_2$) gas, and the reaction tube was left to stand for cooling. To again conduct a pretreatment, the temperature in the reaction tube was reduced to a room temperature, the above-described reaction gas was introduced into the reaction tube, and the temperature of the reaction tube was elevated to 200° C. and held at that temperature for 30 minutes. Thereafter, the temperature of the reaction tube was elevated to 800° C. at an elevation rate of 5° C./min. (hereinafter, Reaction 2).

In each of Reactions 1 and 2, a maximum catalytic activity in terms of a NO conversion efficiency was determined, and the catalytic activity (durability) of the catalyst was evaluated from the comparison of the NO conversion efficiency of Reaction 1 with that of Reaction 2. Note, NO means nitrogen oxide contained as a toxic component in the reaction gas, and the NO conversion efficiency is calculated from the following equation:

$$NO \text{ conversion efficiency } (\%) = \frac{(NO_{in} - NO_{out})}{NO_{in}} \times 100$$

in which $NO_{in}$ is a concentration of NO at an inlet of the reaction tube, and $NO_{out}$ is a concentration of NO at an outlet of the reaction tube. The results of the evaluation of the catalytic activity are summarized in the following Table 1.

For comparison, the above procedure was repeated by using Comparative Catalysts Nos. 1 to 4 prepared in Comparative Examples 1 to 4. The results of the evaluation of the catalytic activity are also summarized in the following Table 1.

TABLE 1

| Catalyst | maximum catalytic activity (Reaction 1) | maximum catalytic activity (Reaction 2) |
|---|---|---|
| Catalyst No. 1 | 67 | 66 |
| Catalyst No. 2 | 71 | 69 |
| Catalyst No. 3 | 66 | 63 |
| Catalyst No. 4 | 56 | 43 |
| Comparative Catalyst No. 1 | 38 | 22 |
| Comparative Catalyst No. 2 | 42 | 36 |
| Comparative Catalyst No. 3 | 42 | 34 |
| Comparative Catalyst No. 4 | 98 | 33 |

The results in this table indicate that the catalysts according to the present invention, compared with the comparative catalysts, can maintain an excellent exhaust gas purification capability in oxygen-excess exhaust gas, without a substantial lowering thereof, after use at 800° C. for 5 hours. Namely, the catalysts of the present invention have a remarkably excellent heat resistance and durability. These results suggest that the catalysts of the present invention can be advantageously used in the purification of oxygen-excess exhaust gas containing nitrogen oxides ($NO_x$), carbon monoxide (CO) and hydrocarbons (HC).

EXAMPLE 5

Preparation of Catalyst No. 5

An amount of 20 g of $NH_4^+$ ion exchanged ZSM-5 having a molar ratio of $SiO_2/Al_2O_3$ of 40 was mixed with 80 g of an aqueous solution of barium chloride (concentration: 1.09 mole/l), and the mixture was stirred at 80° C. for 16 hours. After the solid-liquid separation, the mixture was thoroughly washed with water, followed by mixing with 180 g of an aqueous solution of cobalt (II) acetate.tetrahydrate (concentration: 0.23 mole/l), and the mixture was stirred at 80° C. for 16 hours. After the slurry was subjected to a solid-liquid separation, the separated zeolite cake was added to a newly-prepared aqueous solution of cobalt (II) acetate.tetrahydrate having the same composition as that used in the above step, followed by the same procedure. After the solid-liquid separation, the separated zeolite cake was thoroughly washed with water, and then dried at 110° C. for 10 hours. A chemical analysis of the thus obtained catalyst (hereinafter referred to as Catalyst No. 5) indicated that Catalyst No. 5 contains the barium in a molar ratio of $BaO/Al_2O_3$ in the zeolite of 0.44 and the cobalt (II) in a molar ratio of $CoO/Al_2O_3$ in the zeolite of 1.13, respectively.

EXAMPLE 6

Preparation of Catalyst No. 6

The procedure of Example 5 was repeated except that the barium chloride was replaced with the corresponding strontium salt. A chemical analysis of the thus obtained catalyst (hereinafter referred to as Catalyst No. 6) indicated that the Catalyst No. 6 contains the strontium in a molar ratio of $SrO/Al_2O_3$ in the zeolite of 0.23 and the cobalt (II) in a molar ratio of $CoO/Al_2O_3$ in the zeolite of 1.12, respectively.

EXAMPLE 7

Preparation of Catalyst No. 7

The procedure of Example 5 was repeated except that the barium chloride was replaced with the corresponding magnesium salt. A chemical analysis of the thus obtained catalyst (hereinafter referred to as Catalyst No. 7) indicated that the Catalyst No. 7 contains the magnesium in a molar ratio of $MgO/Al_2O_3$ in the zeolite of 0.18 and the cobalt (II) in a molar ratio of $CoO/Al_2O_3$ in the zeolite of 1.08, respectively.

EXAMPLE 8

Preparation of Catalyst No. 8

The procedure of Example 5 was repeated except that the barium chloride was replaced with the corresponding calcium salt. A chemical analysis of the thus obtained catalyst (hereinafter referred to as Catalyst No. 8) indicated that the Catalyst No. 8 contains the calcium in a molar ratio of $CaO/Al_2O_3$ in the zeolite of 0.16 and the cobalt (II) in a molar ratio of $CoO/Al_2O_3$ in the zeolite of 1.04, respectively.

EXAMPLE 9

Preparation of Catalyst No. 9

An amount of 20 g of $NH_4^+$ ion exchanged ZSM-5 having a molar ratio of $SiO_2/Al_2O_3$ of 40 was mixed with 180 g of an aqueous solution of cobalt (II) acetate.-tetrahydrate (concentration: 1.23 mole/l), and stirred at 80° C. for 16 hours. After the slurry was subjected to a solid-liquid separation, the separated zeolite cake was mixed with a newly-prepared aqueous solution of cobalt (II) acetate-tetra hydrate having the same composition as that used in the above step, followed by the same procedure. The slurry was mixed with 180 g of an aqueous solution of barium chloride (concentration: 1.09 mole/l), and the mixture was stirred at 80° C. for 16 hours. After the solid-liquid separation, the separated zeolite cake was thoroughly washed with water, and then dried at 110° C. for 10 hours. A chemical analysis of the thus obtained catalyst (hereinafter referred to as Catalyst No. 9) indicated that Catalyst No. 9 contains the barium in a molar ratio of $BaO/Al_2O_3$ in the zeolite of 0.58 and the cobalt (II) in a molar ratio of $CoO/Al_2O_3$ in the zeolite of 1.22, respectively.

EXAMPLE 10

Preparation of Catalyst No. 10

An amount of 20 g of $NH_4^+$ ion exchanged ZSM-5 having a molar ratio of $SiO_2/Al_2O_3$ of 40 was mixed with 180 g of an aqueous solution of cobalt (II) acetate.-tetrahydrate (concentration: 0.23 mole/l), and stirred at 80° C. for 16 hours. After the slurry was subjected to a solid-liquid separation, the separated zeolite cake was mixed with a newly-prepared aqueous solution of cobalt (II) acetate.tetrahydrate having the same composition as that used in the above step, followed by the same procedure. After the solid-liquid separation, the separated zeolite cake was thoroughly washed with water, and then dried at 110° C. for 10 hours. A chemical analysis of the thus obtained zeolite catalyst indicated that it contains the cobalt (II) in a molar ratio of $CoO/Al_2O_3$ in the zeolite of 1.40.

Thereafter, 20 g of the above zeolite catalyst was mixed with 29 ml (0.05 mole/l) of an aqueous solution of barium nitrate containing the barium in an amount corresponding to 1% by weight of metallic barium. The mixture was first dried at 85° C. for 10 hours, and then dried at 110° C. for 10 hours, for an evaporation to dryness. The thus obtained catalyst is hereinafter referred to as Catalyst No. 10.

Comparative Example 5

Preparation of Comparative Catalyst No. 5

An amount of 20 g of $NH_4^+$ ion exchanged ZSM-5 having a molar ratio of $SiO_2/Al_2O_3$ of 40 was mixed with 180 g of an aqueous solution of cobalt (II) acetate.-tetrahydrate (concentration: 0.23 mole/l), and stirred at 80° C. for 16 hours. After the slurry was subjected to a solid-liquid separation, the separated zeolite cake was mixed with a newly-prepared aqueous solution of cobalt (II) acetate.tetra hydrate having the same composition as that used in the above step, followed by the same procedure. After the solid-liquid separation, the separated zeolite cake was thoroughly washed with water, and then dried at 110° C. for 10 hours. A chemical analysis of the thus obtained catalyst (hereinafter referred to as Comparative Catalyst No. 5) indicated that Comparative Catalyst No. 5 contains the cobalt (II) in a molar ratio of $CoO/Al_2O_3$ in the zeolite of 1.39.

Comparative Example 6

Preparation of Comparative Catalyst No. 6

An amount of 20 g of $NH_4^+$ ion exchanged ZSM-5 having a molar ratio of $SiO_2/Al_2O_3$ of 40 mixed with 180 g of an aqueous solution of barium chloride (concentration: 1.09 mole/l), and the mixture was stirred at 80° C. for 16 hours. After the solid-liquid separation, the separated zeolite cake was thoroughly washed with water, and then dried at 110° C. for 10 hours. A chemical analysis of the thus obtained catalyst (hereinafter referred to as Comparative Catalyst No. 6) indicated that Comparative Catalyst No. 6 contains the barium in a molar ratio of $BaO/Al_2O_3$ in the zeolite of 0.76.

Catalytic Activity Evaluation of Catalysts Nos. 5 to 10 and Comparative Catalyst Nos. 5 and 6

To evaluate a catalytic activity of each of Catalysts Nos. 5 to 10 prepared in Examples 5 to 10, the above-described procedure of catalytic activity evaluation of Catalysts Nos. 1 to 4 and Comparative Catalysts Nos. 1 to 4 was repeated. The results for the evaluation of the catalytic activity are summarized in the following Table 2.

For comparison, the above procedure was repeated by using Comparative Catalysts Nos. 5 and 6 prepared in Comparative Examples 5 and 6. The results for the evaluation of the catalytic activity are also summarized in the following Table 2. Note, for reference, the results of Comparative Catalyst No. 4 found in Table 1 are also incorporated.

TABLE 2

| Catalyst | maximum catalytic activity (Reaction 1) | maximum catalytic activity (Reaction 2) |
|---|---|---|
| Catalyst No. 5 | 85 | 79 |
| Catalyst No. 6 | 82 | 78 |
| Catalyst No. 7 | 75 | 71 |
| Catalyst No. 8 | 78 | 71 |
| Catalyst No. 9 | 73 | 72 |
| Catalyst No. 10 | 75 | 72 |
| Comparative Catalyst No. 4 | 98 | 33 |
| Comparative Catalyst No. 5 | 67 | 66 |
| Comparative Catalyst No. 6 | 45 | 23 |

The results in this table indicate that the catalysts according to the present invention, compared with the comparative catalysts, can exhibit an excellent exhaust gas purification capability in an oxygen-excess exhaust gas as well as a remarkably excellent heat resistance and durability, both at the initial stage of purification and after purification at 800° C. for 5 hours.

Accordingly, even if the exhaust gas contains an excess amount of oxygen, nitrogen oxides ($NO_x$), carbon monoxide (CO) and hydrocarbons (HC) can be effectively removed from the exhaust gas by bringing the exhaust gas into contact with the catalysts of the present invention.

EXAMPLE 11

Preparation of Catalyst No. 11

An amount of 20 g of $NH_4^+$ ion exchanged ZSM-5 having a molar ratio of $SiO_2/Al_2O_3$ of 40 was mixed with 180 g of an aqueous solution of lanthanum chloride (concentration: 1.09 mole/l), and the mixture was stirred at 80° C. for 16 hours. After the solid-liquid separation, the mixture was thoroughly washed with water, followed by mixing with into 180 g of an aqueous solution of cobalt (II) acetate.tetrahydrate (concentration: 0.23 mole/l), and the mixture was stirred at 80° C. for 16 hours. After the slurry was subjected to a solid-liquid separation, the separated zeolite cake was mixed with a newly-prepared aqueous solution of cobalt (II) acetate.tetrahydrate having the same composition as that used in the above step, followed by the same procedure. After the solid-liquid separation, the separated zeolite cake was thoroughly washed with water, and then dried at 110° C. for 10 hours. A chemical analysis of the thus obtained catalyst (hereinafter referred to as Catalyst No. 11) indicated that Catalyst No. 11 contains the lanthanum in a molar ratio of $LaO/Al_2O_3$ in the zeolite of 0.33 and the cobalt (II) in a molar ratio of $CoO/Al_2O_3$ in the zeolite of 1.13, respectively.

EXAMPLE 12

Preparation of Catalyst No. 12

The procedure of Example 11 was repeated except that the lanthanum chloride was replaced with the corresponding cerium salt. A chemical analysis of the thus obtained catalyst (hereinafter referred to as Catalyst No. 12) indicated that the Catalyst No. 12 contains the cerium in a molar ratio of $CeO/Al_2O_3$ in the zeolite of 0.13 and the cobalt (II) in a molar ratio of $CoO/Al_2O_3$ in the zeolite of 1.12, respectively.

EXAMPLE 13

Preparation of Catalyst No. 13

The procedure of Example 11 was repeated except that the lanthanum chloride was replaced with the corresponding yttrium salt. A chemical analysis of the thus obtained catalyst (hereinafter referred to as Catalyst No. 13) indicated that the Catalyst No. 13 contains the yttrium in a molar ratio of $YO/Al_2O_3$ in the zeolite of 0.12 and the cobalt (II) in a molar ratio of $CoO/Al_2O_3$ in the zeolite of 1.08, respectively.

EXAMPLE 14

Preparation of Catalyst No. 14

The procedure of Example 11 was repeated except that the lanthanum chloride was replaced with the corresponding neodymium salt. A chemical analysis of the thus obtained catalyst (hereinafter referred to as Catalyst No. 14) indicated that the Catalyst No. 14 contains the neodymium in a molar ratio of $NdO/Al_2O_3$ in the zeolite of 0.11 and the cobalt (II) in a molar ratio of $CoO/Al_2O_3$ in the zeolite of 1.04, respectively.

EXAMPLE 15

Preparation of Catalyst No. 15

An amount of 20 g of $NH_4^+$ ion exchanged ZSM-5 having a molar ratio of $SiO_2/Al_2O_3$ of 40 was mixed with 180 g of an aqueous solution of cobalt (II) acetate-tetrahydrate (concentration: 0.23 mole/l), and stirred at 80° C. for 16 hours. After the slurry was subjected to a solid-liquid separation, the separated zeolite cake was mixed with a newly prepared aqueous solution of cobalt (II) acetate.tetrahydrate having the same composition as that used in the above step, followed by the same procedure. The slurry was mixed with 180 g of an aqueous solution of lanthanum chloride (concentration: 1.09 mole/l), and the mixture was stirred at 80° C. for 16 hours. After the solid-liquid separation, the separated zeolite cake was thoroughly washed with water, and then dried at 110° C. for 10 hours. A chemical analysis of the thus obtained catalyst (hereinafter referred to as Catalyst No. 15) indicated that Catalyst No. 15 contains the lanthanum in a molar ratio of $LaO/Al_2O_3$ in the zeolite of 0.44 and the cobalt (II) in a molar ratio of $CoO/Al_2O_3$ in the zeolite of 1.22, respectively.

EXAMPLE 16

Preparation of Catalyst No. 16

An amount of 20 g of $NH_4^+$ ion exchanged ZSM-5 having a molar ratio of $SiO_2/Al_2O_3$ of 40 was mixed with 180 g of an aqueous solution of cobalt (II) acetate.tetrahydrate (concentration: 0.23 mole/l), and stirred at 80° C. for 16 hours. After the slurry was subjected to a solid-liquid separation, the separated zeolite cake was mixed with a newly prepared aqueous solution of cobalt (II) acetate.tetrahydrate having the same composition as that used in the above step, followed by the same procedure. After the solid-liquid separation, the separated zeolite cake was thoroughly washed with water, and then dried at 110° C. for 10 hours. A chemical analysis of the thus obtained zeolite catalyst indicated that it contains the cobalt (II) in a molar ratio of $CoO/Al_2O_3$ in the zeolite of 1.40.

Therefore, 20 g of the above zeolite catalyst was poured into 29 ml (0.05 mole/l) of an aqueous solution of lanthanum nitrate containing the lanthanum in an amount corresponding to 1.9% by weight of metallic lanthanum. The mixture was first dried at 85° C. for 10 hours, and then dried at 110° C. for 10 hours to conduct an evaporation to dryness. The thus obtained catalyst is hereinafter referred to as Catalyst No. 16.

Comparative Example 7

Preparation of Comparative Catalyst No. 7

An amount 20 g of $NH_4^+$ ion exchanged ZSM-5 having a molar ratio of $SiO_2/Al_2O_3$ of 40 was mixed with 180 g of an aqueous solution of lanthanum chloride (concentration: 1.09 mole/l), and the mixture was stirred at 80° C. for 16 hours. After the solid-liquid separation, the separated zeolite cake was thoroughly washed with water, and then dried at 110° C. for 10 hours. A chemical analysis of the thus obtained catalyst (hereinafter referred to as Comparative Catalyst No. 7) indicated that Comparative Catalyst No. 7 contains the lanthanum in a molar ratio of $LaO/Al_2O_3$ in the zeolite of 0.55.

Catalytic Activity Evaluation of Catalysts Nos. 11 to 16 and Comparative Catalyst No. 7

To evaluate a catalytic activity of each of Catalysts Nos. 11 to 16 prepared in Examples 11 to 16, the above-described procedure of catalytic activity evaluation of Catalysts Nos. 1 to 4 and Comparative Catalysts Nos. 1 to 4 was repeated. The results for the evaluation of the catalytic activity are summarized in the following Table 3.

For comparison, the above procedure was repeated by using Comparative Catalyst No. 7 prepared in Comparative Example 7. The results of the evaluation of the catalytic activity are also summarized in the following Table 3. Note, for reference, the results of Comparative Catalysts Nos. 4 and 5 found in Table 2 are also incorporated.

TABLE 3

| Catalyst | maximum catalytic activity (Reaction 1) | maximum catalytic activity (Reaction 2) |
|---|---|---|
| Catalyst No. 11 | 83 | 78 |
| Catalyst No. 12 | 79 | 76 |
| Catalyst No. 13 | 70 | 67 |
| Catalyst No. 14 | 70 | 70 |
| Catalyst No. 15 | 77 | 69 |
| Catalyst No. 16 | 81 | 73 |
| Comparative Catalyst No. 4 | 98 | 33 |
| Comparative Catalyst No. 5 | 67 | 66 |
| Comparative Catalyst No. 7 | 39 | 24 |

The results in this table indicate that the catalysts according to the present invention, compared with the comparative catalysts, exhibit an excellent exhaust gas purification capability in an oxygen-excess exhaust gas as well as a remarkably excellent heat resistance and durability, in both at the initial stage of purification and after purification at 800° C. for 5 hours.

Accordingly, even if the exhaust gas contains an excess amount of oxygen, nitrogen oxides ($NO_x$), carbon monoxide (CO) and hydrocarbons (HC) can be effectively removed from the exhaust gas by bringing the exhaust gas into contact with the catalysts of the present invention.

EXAMPLE 17

Preparation of Catalysts Nos. 17 to 27

Powders of $NH_4^+$ ion exchanged ZSM-5 having a molar ratio of $SiO_2/Al_2O_3$ of 40 were mixed with an aqueous solution containing the acetate and/or nitrate of cobalt, alkali earth metal and rare earth metal described in the following Table 4 in the described amount. After dipping in the aqueous solution for 15 minutes, the zeolite powders were dried at 110° C. for 10 hours. The dried zeolite powders were then calcined at 500° C. for 3 hours in air. The zeolite catalyst, as described in the following Table 4, referred to as one of Catalysts Nos. 17 to 27 was thus obtained.

TABLE 4

| Catalyst | Composition and amount (wt. %) |
|---|---|
| Catalyst No. 17 | Co(3) + La(2) + Ba(1) |
| Catalyst No. 18 | Co(3) + La(2) + Ca(1) |
| Catalyst No. 19 | Co(3) + La(2) + Mg(1) |
| Catalyst No. 20 | Co(3) + La(0.06) + Sr(1) |
| Catalyst No. 21 | Co(3) + La(0.1) + Sr(1) |
| Catalyst No. 22 | Co(3) + La(2) + Sr(1) |
| Catalyst No. 23 | Co(3) + La(5) + Sr(1) |
| Catalyst No. 24 | Co(3) + La(10) + Sr(1) |
| Catalyst No. 25 | Co(3) + La(2) + Sr(10) |
| Catalyst No. 26 | Co(3) + Pr(2) + Sr(1) |
| Catalyst No. 27 | Co(3) + Y(2) + Sr(1) |

Comparative Example 8

Preparation of Comparative Catalysts Nos. 8 to 14

Powders of $NH_4^+$ ion exchanged ZSM-5 having a molar ratio of $SiO_2/Al_2O_3$ of 40 were mixed with an aqueous solution containing the acetate and/or nitrate of at least one of cobalt, alkali earth metal and rare earth metal described in the following Table 5 in the described amount. After dipping in the aqueous solution for 15 minutes, the zeolite powders were dried at 110° C. for 10 hours. The dried zeolite powders were then calcined at 500° C. for 3 hours in air. The zeolite catalyst, as described in the following Table 5, referred to as one of Comparative Catalysts Nos. 8 to 14 was thus obtained.

Comparative Example 9

Preparation of Comparative Catalyst No. 15

The procedure of Comparative Example 8 was repeated except that the zeolite powders were mixed with an aqueous solution of copper (II) acetate for 5 minutes. The zeolite catalyst, as described in the following Table 5, referred to as Comparative Catalyst No. 15 was thus obtained.

TABLE 5

| Catalyst | Composition and amount (wt. %) |
|---|---|
| Comparative Catalyst No. 8 | Co(3) |
| Comparative Catalyst No. 9 | Co(3) + La(2) |
| Comparative Catalyst No. 10 | Co(3) + Sr(2) |
| Comparative Catalyst No. 11 | Co(3) + La(0.03) + Sr(1) |
| Comparative Catalyst No. 12 | Co(3) + La(15) + Sr(1) |
| Comparative Catalyst No. 13 | Co(3) + La(2) + Sr(15) |
| Comparative Catalyst No. 14 | Co(3) + La(2) + Sr(20) |
| Comparative Catalyst No. 15 | Cu(3) |

Catalytic Activity Evaluation of Catalysts Nos. 17 to 27 and Comparative Catalysts Nos. 8 to 15

To evaluate a catalytic activity of each of Catalysts Nos. 17 to 27 in Table 4 and Comparative Catalysts Nos. 8 to 15, each zeolite catalyst was pelletized and then exposed to a simulated exhaust gas of automobiles, i.e., model gas, having the following composition:

| Component | Amount (vol. %) |
|---|---|
| CO | 0.1 |
| $H_2$ | 0.033 |
| $C_3H_6$ | 0.04 |
| NO | 0.05 |
| $NO_2$ | 0.017 |
| $O_2$ | 4.0 |
| $CO_2$ | 10.0 |
| $H_2O$ | 3.0 |
| $N_2$ | balance | at 800° C. for 5 hours. The model gas was formulated so that it had a composition similar to that of the oxygen-excess exhaust gas from a lean burn automobile engine. Thereafter, the same model gas was introduced catalyst. This determination of the $NO_x$ conversion into the reaction tube filled with the catalyst, to determine a $NO_x$ conversion efficiency (%) of the efficiency was made in the manner described in the catalytic activity evaluation of Catalysts Nos. 1 to 4 and Comparative Catalysts Nos. 1 to 4. The results of the evaluation of the catalytic activity are summarized in the following Table 6.

TABLE 6

| Catalyst | NO conversion efficiency (%) |
|---|---|
| Catalyst No. 17 | 45 |
| Catalyst No. 18 | 44 |
| Catalyst No. 19 | 44 |
| Catalyst No. 20 | 45 |
| Catalyst No. 21 | 52 |
| Catalyst No. 22 | 56 |
| Catalyst No. 23 | 62 |
| Catalyst No. 24 | 51 |
| Catalyst No. 25 | 54 |
| Catalyst No. 26 | 44 |

TABLE 6-continued

| Catalyst | NO conversion efficiency (%) |
|---|---|
| Catalyst No. 27 | 46 |
| Comparative Catalyst No. 8 | 36 |
| Comparative Catalyst No. 9 | 41 |
| Comparative Catalyst No. 10 | 40 |
| Comparative Catalyst No. 11 | 33 |
| Comparative Catalyst No. 12 | 34 |
| Comparative Catalyst No. 13 | 41 |
| Comparative Catalyst No. 14 | 35 |
| Comparative Catalyst No. 15 | 30 |

The results in this table indicate that the catalysts according to the present invention have a significantly excellent durability, compared with the comparative catalysts.

EXAMPLE 18

Preparation of Catalysts Nos. 28 and 29

An amount of 20 g of $NH_4^+$ ion exchanged ZSM-5 having a molar ratio of $SiO_2/Al_2O_3$ of 40 was mixed with 80 g of an aqueous solution of cobalt (II) acetate.-tetrahydrate (concentration: 0.23 mole/l), and the mixture was stirred at 80° C. for 16 hours. After the slurry was subjected to a solid-liquid separation, the separated zeolite cake (cake of Co-ion exchanged zeolite) was dipped in an aqueous solution of La+Ba (Preparation of Catalyst No. 28) or La+Sr (Preparation of Catalyst No. 29) having the composition described in the following Table 7, dried at 110° C. for 10 hours, and then calcined at 500° C. for 3 hours in air. The zeolite catalyst, as described in the following Table 7, referred to as Catalyst No. 28 or 29 was thus obtained.

Comparative Example 10

Preparation of Comparative Catalyst No. 16

An amount of 20 g of NH4+ ion exchanged ZSM-5 having a molar ratio of $SiO_2/Al_2O_3$ of 40 was dipped in an aqueous solution of Cu (II)-amine complex (concentration: 0.1 mole/l). Immediately after dipping, 25% ammonia water was added to the above aqueous solution to adjust a pH value thereof to 10.5, and ion-exchanged at 30° C. overnight. After the slurry was subjected to a solid-liquid separation, the separated zeolite cake was thoroughly washed with water, and dried at 110° C. for 10 hours. The zeolite catalyst, as described in the following Table 7, referred to herein as Comparative Catalyst No. 16 was thus obtained.

Catalytic Activity Evaluation of Catalyst Nos. 28 and 29 and Comparative Catalyst No. 16

To evaluate a catalytic activity of each of Catalysts Nos. 28 and 29 and Comparative Catalyst No. 16, the above-described procedure of catalytic activity evaluation of Catalysts Nos. 17 to 27 and Comparative Catalysts Nos. 8 to 15 was repeated. The results of the evaluation of the catalytic activity are summarized in the following Table 7.

TABLE 7

| Catalyst | Composition and amount (wt %) | $NO_x$ conversion efficiency (%) |
|---|---|---|
| Catalyst No. 28 | Co(2.45) + La(1.6) + Ba(0.8) | 52 |
| Catalyst No. 29 | Co(2.45) + La(1.6) + Sr(0.8) | 58 |
| Comparative Catalyst No. 16 | Cu(2.45) | 35 |

The results in this table indicate that the catalysts according to the present invention have a significantly excellent durability compared to that of the comparative catalyst.

Evaluation of Catalytic Activity under City Cruising Conditions

To evaluate a catalytic activity of each of Catalyst No. 29 (Example 18) and Comparative Catalyst No. 16 (Example 10) under city cruising conditions, 500 g of powders of the zeolite catalyst, 700 g of silica gel (10% by weight of $SiO_2$) and 100 g of pure water were mixed, and a pH value of the mixture was adjusted with 2.5% ammonia water to a range of from 10 to 11. The resulting slurry of zeolite was coated at a coverage of 120 g/l over a honeycomb body of cordierite (0.7 l volume). The honeycomb bodies with the zeolite catalyst (Catalyst No. 29 and Comparative Catalyst No. 16) are referred to herein as Catalyst Bodies Nos. 1 and 2, respectively.

The Catalyst Bodies Nos. 1 and 2 were tested with regard to the initial catalytic activity and durability thereof (change of the catalytic activity after 1,000 km cruising and 30,000 km cruising, respectively, of the automobile engine). The automobile used in these tests had a body weight of 1 ton and was provided with a 1,600 cc lean burn engine.

Conditions of Durability Test

The exhaust system of the test engine was charged with the Catalyst Body No. 1 or 2, and the engine run under simulated city cruising conditions. Namely, a maximum temperature of the exhaust gas at an inlet of the exhaust system was increased to about 800° C., and under this temperature condition, the engine was continuously run for a time corresponding to 1,000 km cruising and 30,000 km cruising.

Determination of $NO_x$ Conversion Efficiency

The avoce-described procedure of catalytic activity evaluation of Catalysts Nos. 17 to 27 and Comparative Catalysts Nos. 8 to 15 was repeated, to determine an $NO_x$ conversion efficiency (%) of Catalyst Bodies 1 and 2. The engine was run at an average air/fuel (A/F) ratio of 22 and an inlet gas temperature of 400° C. The initial catalytic activity and durability of each catalyst body are summarized in the following table.

TABLE 8

| Catalyst body | $NO_x$ conversion efficiency (%) | | |
|---|---|---|---|
| | before test (before cruising) | after 1,000 km cruising | after 30,000 km cruising |
| No. 1 | 60 | 58 | 56 |
| No. 2 (Comparative) | 40 | 35 | 32 |

The results in this table indicate that, in contrast to the comparative catalyst body, the catalyst bodies of the present invention have a high purification capability for oxygen-excess exhaust gas and a significantly high durability. Note, the high purification efficiency of the catalyst body of the present invention was retained without a substantial change thereof.

We claim:

1. A method of purifying an exhaust gas containing nitrogen oxides, carbon monoxide, hydrocarbons, and an excess amount of oxygen, which comprises bringing a catalyst into contact with the exhaust gas to remove nitrogen oxides, carbon monoxide and hydrocarbons from the exhaust gas, wherein the nitrogen oxides are reduced without the use of an additional reducing agent, the catalyst comprising a cobalt ion-exchanged zeolite, said zeolite being selected from the group consisting of ferrierite, ZSM-5, ZSM-11, ZSM-12, and ZSM-20 and having a silica to alumina molar ratio of 15 to 1000, the molar amount of cobalt being 1.09 to 1.6 times higher than the molar amount, of alumina.

2. A method according to claim 1, in which the exhaust gas originates from an internal combustion engine of an automobile.

3. A method according to claim 2, in which the internal combustion engine is run at a lean air-fuel ratio.

4. A method of purifying an exhaust gas containing nitrogen oxides, carbon monoxide, hydrocarbons, and an excess amount of oxygen, which comprises bringing a catalyst into contact with the exhaust gas to remove nitrogen oxides, carbon monoxide and hydrocarbons from the exhaust gas, whereby the nitrogen oxides are reduced without the use of an additional reducing agent, the catalyst comprising a zeolite ion-exchanged with both cobalt and at least one metal selected from the group consisting of alkaline earth metals and rare earth metals, the zeolite being selected from the group consisting of ferrierite, ZSM-5, ZSM-11, ZSM-12, and ZSM-20 and having a silica to alumina molar ratio of 15 to 1000.

5. A method according to claim 5, in which the exhaust gas originates from an internal combustion engine of an automobile.

6. A method according to claim 5, in which the internal combustion engine is run at a lean air-fuel ratio.

* * * * *

UNITED STATES PATENT AND TRADEMARK OFFICE
CERTIFICATE OF CORRECTION

PATENT NO. : 5,433,933
DATED : July 18, 1995
INVENTOR(S) : Akinori ESHITA, et al.

It is certified that error appears in the above-indentified patent and that said Letters Patent is hereby corrected as shown below:

On the title page, Item [30], the third Foreign Application Priority Number should read:

--2-149203--

Signed and Sealed this

Fifth Day of September, 1995

Attest:

BRUCE LEHMAN

Attesting Officer

Commissioner of Patents and Trademarks

UNITED STATES PATENT AND TRADEMARK OFFICE
Certificate

Patent No. 5,433,933                                                           Patented: July 18, 1995

On petition requesting issuance of a certificate for correction of inventorship pursuant to 35 U. S. C. 256, it has been found that the above-identified patent, through error and without deceptive intent, improperly sets forth the inventorship.

Accordingly, it is hereby certified that the correct inventorship of this patent is: Akinori Eshita, Senshi Kasahara, Shinichi Matsumoto, Kazunobu Ishibashi, Koji Yokota, Shiroh Kondoh and Koiti Yamasita.

Signed and Sealed this Eleventh Day of November, 1997.

MICHAEL L. LEWIS
*Supervisory Patent Examiner*
Art. Unit 1103